US008486869B2

(12) United States Patent
Brenneis et al.

(10) Patent No.: US 8,486,869 B2
(45) Date of Patent: *Jul. 16, 2013

(54) METHODS OF PLUGGING AND ABANDONING A WELL USING COMPOSITIONS COMPRISING CEMENT KILN DUST AND PUMICITE

(75) Inventors: D. Chad Brenneis, Marlow, OK (US); Craig W. Roddy, Duncan, OK (US); Jeffery D. Karcher, Duncan, OK (US); Callie R. Hudgins, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,406

(22) Filed: Jul. 27, 2012

(65) Prior Publication Data

US 2012/0291674 A1  Nov. 22, 2012

Related U.S. Application Data

(60) Division of application No. 12/821,412, filed on Jun. 23, 2010, now Pat. No. 8,307,899, which is a continuation-in-part of application No. 12/606,381, filed on Oct. 27, 2009, now Pat. No. 7,743,828, which is a continuation-in-part of application No. 12/420,630, filed on Apr. 8, 2009, now Pat. No. 7,631,692, which is a continuation-in-part of application No. 12/349,676, filed on Jan. 7, 2009, now Pat. No. 7,674,332, which is a division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(51) Int. Cl.
*C09K 8/46* (2006.01)
*E21B 33/13* (2006.01)

(52) U.S. Cl.
USPC .......... 507/269; 507/276; 166/285; 106/612; 106/631; 106/681; 106/716; 106/793

(58) Field of Classification Search
None
See application file for complete search history.

(56) References Cited

U.S. PATENT DOCUMENTS

| | | | |
|---|---|---|---|
| 2,021,956 A * | 11/1935 | Gladney | 252/378 R |
| 2,045,899 A | 6/1936 | Davis | |
| 2,094,316 A | 9/1937 | Cross et al. | |
| 2,133,622 A * | 10/1938 | Larmour et al. | 106/737 |
| 2,193,775 A | 3/1940 | Stratford | |
| 2,193,807 A | 3/1940 | Dieterich | |
| 2,329,940 A | 9/1943 | Ponzer | |
| 2,772,739 A | 12/1956 | Arie | |
| 2,842,205 A | 7/1958 | Allen et al. | |
| 2,848,051 A | 8/1958 | Willaims | |
| 2,871,133 A | 1/1959 | Palonen et al. | |
| 2,880,096 A | 3/1959 | Hurley | |
| 2,945,769 A | 7/1960 | Gama et al. | |
| 3,066,031 A * | 11/1962 | Schifferle | 106/757 |
| 3,168,139 A | 2/1965 | Kennedy et al. | |
| 3,320,077 A | 5/1967 | Prior | |
| 3,411,580 A | 11/1968 | Roberts et al. | |
| 3,454,095 A | 7/1969 | Messenger et al. | |
| 3,467,193 A | 9/1969 | Messenger | |
| 3,473,939 A * | 10/1969 | Mayberry et al. | 501/117 |
| 3,499,491 A | 3/1970 | Wyant et al. | |
| 3,557,876 A | 1/1971 | Tragesser | |
| 3,574,816 A | 4/1971 | Abbdellatif et al. | |
| 3,748,159 A | 7/1973 | George | |
| 3,749,173 A | 7/1973 | Hill et al. | |
| 3,863,718 A | 2/1975 | Bruist | |
| 3,876,005 A | 4/1975 | Fincher et al. | |
| 3,887,009 A | 6/1975 | Miller et al. | |
| 3,887,385 A | 6/1975 | Quist et al. | |
| 3,959,007 A | 5/1976 | Pitt | |
| 4,018,617 A | 4/1977 | Nicholson | |
| 4,018,619 A | 4/1977 | Webster et al. | |
| 4,031,184 A | 6/1977 | McCord | |
| 4,036,301 A | 7/1977 | Powers et al. | |
| 4,101,332 A | 7/1978 | Nicholson | |
| 4,105,459 A | 8/1978 | Mehta | |
| 4,141,843 A | 2/1979 | Watson | |
| 4,176,720 A | 12/1979 | Wilson | |

(Continued)

FOREIGN PATENT DOCUMENTS

| | | |
|---|---|---|
| CA | 2064682 | 4/1992 |
| CA | 2336077 | 1/2000 |

(Continued)

OTHER PUBLICATIONS

U.S. Appl. No. 13/477,777, filed May 22, 2012, Roddy.
U.S. Appl. No. 13/479,476, filed May 24, 2012, Roddy.
U.S. Appl. No. 13/535,145, filed Jun. 27, 2012, Benkley et al.
U.S. Appl. No. 13/560,406, filed Jul. 27, 2012, Brenneis et al.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.

(Continued)

*Primary Examiner* — John J Figueroa
(74) *Attorney, Agent, or Firm* — Craig W. Roddy; Tumey L.L.P.

(57) ABSTRACT

The present invention is directed to plug-and-abandon operations that use plugging compositions comprising cement kiln dust, pumicite, and/or lime. An embodiment includes a method of plugging a well bore for abandonment comprising: placing a plugging composition in the well bore, the plugging composition comprising: cement kiln dust in an amount of about 5% to about 100% by weight of cementitious components, pumicite in an amount of about 5% to about 100% by weight of cementitious components, 0% to about 24% of Portland cement by weight of cementitious components, and water; and allowing the plugging composition to set and form a plug.

20 Claims, No Drawings

U.S. PATENT DOCUMENTS

| | | |
|---|---|---|
| 4,268,316 A | 5/1981 | Wills et al. |
| 4,274,881 A | 6/1981 | Langton |
| 4,304,300 A | 12/1981 | Watson |
| 4,341,562 A | 7/1982 | Ahlbeck |
| RE31,190 E | 3/1983 | Detroit et al. |
| 4,407,677 A | 10/1983 | Wills et al. |
| 4,432,800 A | 2/1984 | Kneller et al. |
| 4,435,216 A | 3/1984 | Diehl et al. |
| 4,436,850 A | 3/1984 | Burdick et al. |
| 4,460,292 A | 7/1984 | Durham et al. |
| 4,470,463 A | 9/1984 | Holland |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,829,107 A | 5/1989 | Kindt et al. |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,113,943 A | 5/1992 | Wilson et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,290,355 A | 3/1994 | Jakel et al. |
| 5,295,543 A | 3/1994 | Terry et al. |
| 5,305,831 A | 4/1994 | Nahm |
| 5,314,022 A | 5/1994 | Cowan et al. |
| 5,316,083 A | 5/1994 | Nahm et al. |
| 5,327,968 A | 7/1994 | Onan et al. |
| 5,337,824 A | 8/1994 | Cowan |
| 5,339,902 A | 8/1994 | Harris |
| 5,346,548 A | 9/1994 | Mehta |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,417,759 A | 5/1995 | Huddleston |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,123 A | 6/1996 | Carpenter et al. |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,641,584 A | 6/1997 | Andersen et al. |
| 5,673,753 A | 10/1997 | Hale et al. |
| 5,681,384 A | 10/1997 | Liskowitz |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A | 2/1999 | Carpenter et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer |
| 6,451,104 B2 | 9/2002 | Mehta |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B1 | 12/2003 | Chatterji et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |

| | | | | | |
|---|---|---|---|---|---|
| 6,716,282 B2 | 4/2004 | Griffith et al. | 2004/0079260 A1 | 4/2004 | Datta et al. |
| 6,729,405 B2 | 5/2004 | DiLullo et al. | 2004/0107877 A1 | 6/2004 | Getzlaf et al. |
| 6,755,905 B2 | 6/2004 | Oates | 2004/0108113 A1 | 6/2004 | Luke et al. |
| 6,767,398 B2 | 7/2004 | Trato | 2004/0112600 A1 | 6/2004 | Luke et al. |
| 6,776,237 B2 | 8/2004 | Dao et al. | 2004/0129181 A1 | 7/2004 | Lalande et al. |
| 6,796,378 B2 | 9/2004 | Reddy et al. | 2004/0182577 A1 | 9/2004 | Chatterji et al. |
| 6,797,054 B2 | 9/2004 | Chatterji et al. | 2004/0187740 A1 | 9/2004 | Timmons |
| 6,823,940 B2 | 11/2004 | Reddy et al. | 2004/0188091 A1 | 9/2004 | Luke et al. |
| 6,832,652 B1 | 12/2004 | Dillenbeck et al. | 2004/0191439 A1 | 9/2004 | Bour et al. |
| 6,835,243 B2 | 12/2004 | Brothers et al. | 2004/0211562 A1 | 10/2004 | Brothers et al. |
| 6,837,316 B2 | 1/2005 | Reddy et al. | 2004/0211564 A1 | 10/2004 | Brothers et al. |
| 6,840,318 B2 | 1/2005 | Lee | 2004/0244650 A1 | 12/2004 | Brothers |
| 6,846,357 B2 | 1/2005 | Reddy et al. | 2004/0244977 A1 | 12/2004 | Luke et al. |
| 6,848,519 B2 | 2/2005 | Reddy et al. | 2004/0256102 A1 | 12/2004 | Trato |
| 6,874,578 B1 | 4/2005 | Garnier | 2004/0262000 A1 | 12/2004 | Morgan et al. |
| 6,883,609 B2 | 4/2005 | Drochon | 2005/0000734 A1 | 1/2005 | Getzlaf et al. |
| 6,887,833 B2 | 5/2005 | Brothers et al. | 2005/0034867 A1 | 2/2005 | Griffith et al. |
| 6,889,767 B2 | 5/2005 | Reddy et al. | 2005/0056191 A1 | 3/2005 | Brothers et al. |
| 6,904,971 B2 | 6/2005 | Brothers et al. | 2005/0061505 A1 | 3/2005 | Caveny et al. |
| 6,908,508 B2 | 6/2005 | Brothers | 2005/0072599 A1 | 4/2005 | Luke et al. |
| 6,911,078 B2 | 6/2005 | Barlet-Gouedard et al. | 2005/0077045 A1 | 4/2005 | Chatterj et al. |
| 7,022,755 B1 | 4/2006 | Chatterji et al. | 2005/0084334 A1 | 4/2005 | Shi et al. |
| 7,048,053 B2 | 5/2006 | Santra et al. | 2005/0098317 A1 | 5/2005 | Reddy et al. |
| 7,077,203 B1 | 7/2006 | Roddy et al. | 2005/0133221 A1 | 6/2005 | Chatterji et al. |
| 7,101,829 B2 | 9/2006 | Guichard | 2006/0025312 A1 | 2/2006 | Santra et al. |
| 7,174,962 B1 | 2/2007 | Roddy et al. | 2006/0054319 A1 | 3/2006 | Fyten |
| 7,182,137 B2 | 2/2007 | Fyten et al. | 2006/0065399 A1 | 3/2006 | Luke et al. |
| 7,199,086 B1 | 4/2007 | Roddy et al. | 2006/0081372 A1 | 4/2006 | Dealy et al. |
| 7,204,307 B2 | 4/2007 | Roddy et al. | 2006/0166834 A1 | 7/2006 | Roddy |
| 7,204,310 B1 | 4/2007 | Roddy et al. | 2006/0175060 A1 | 8/2006 | Reddy |
| 7,213,646 B2 | 5/2007 | Roddy et al. | 2006/0260512 A1 | 11/2006 | Nordmeyer |
| 7,284,609 B2 | 10/2007 | Roddy et al. | 2007/0056475 A1 | 3/2007 | Roddy et al. |
| 7,285,164 B2 | 10/2007 | Luke et al. | 2007/0056479 A1 | 3/2007 | Gray |
| 7,303,015 B2 | 12/2007 | Fyten | 2007/0089643 A1 | 4/2007 | Roddy et al. |
| 7,335,252 B2 | 2/2008 | Roddy et al. | 2007/0102157 A1 | 5/2007 | Roddy et al. |
| 7,337,842 B2 | 3/2008 | Roddy et al. | 2007/0137528 A1 | 6/2007 | LeRoy-Delage et al. |
| 7,338,923 B2 | 3/2008 | Roddy et al. | 2007/0186820 A1 | 8/2007 | O'Hearn |
| 7,341,104 B2 | 3/2008 | Roddy et al. | 2007/0289744 A1 | 12/2007 | Bingamon |
| 7,350,573 B2 | 4/2008 | Reddy | 2008/0092780 A1 | 4/2008 | Bingamon et al. |
| 7,353,870 B2 | 4/2008 | Roddy et al. | 2008/0156491 A1 | 7/2008 | Roddy et al. |
| 7,381,263 B2 | 6/2008 | Roddy et al. | 2008/0229979 A1 | 9/2008 | Lewis |
| 7,387,675 B2 | 6/2008 | Roddy et al. | 2008/0300149 A1 | 12/2008 | Reddy et al. |
| 7,395,860 B2 | 7/2008 | Roddy et al. | 2009/0044726 A1 | 2/2009 | Brouillette et al. |
| 7,404,855 B2 | 7/2008 | Chatterji et al. | 2009/0105099 A1 | 4/2009 | Warrender et al. |
| 7,409,990 B1 | 8/2008 | Burts et al. | 2009/0120644 A1 | 5/2009 | Roddy et al. |
| 7,445,669 B2 | 11/2008 | Roddy et al. | 2009/0124522 A1 | 5/2009 | Roddy et al. |
| 7,478,675 B2 | 1/2009 | Roddy et al. | 2009/0200029 A1 | 8/2009 | Roddy et al. |
| 7,607,482 B2 | 10/2009 | Roddy et al. | 2009/0266543 A1 | 10/2009 | Roddy et al. |
| 7,607,484 B2 | 10/2009 | Roddy et al. | 2009/0312445 A1 | 12/2009 | Roddy et al. |
| 7,627,870 B1 | 12/2009 | Michaeli et al. | 2009/0320720 A1 | 12/2009 | Roddy et al. |
| 7,631,692 B2 | 12/2009 | Roddy et al. | 2010/0025039 A1 | 2/2010 | Roddy et al. |
| 7,674,332 B2 | 3/2010 | Roddy et al. | 2010/0041792 A1 | 2/2010 | Roddy et al. |
| 7,743,828 B2 | 6/2010 | Roddy et al. | 2010/0044043 A1 | 2/2010 | Roddy et al. |
| 7,784,542 B2 | 8/2010 | Roddy et al. | 2010/0044057 A1 | 2/2010 | Dealy et al. |
| 7,789,150 B2 * | 9/2010 | Roddy et al. .................. 166/293 | 2010/0077922 A1 | 4/2010 | Constantz et al. |
| 7,815,880 B2 | 10/2010 | Constantz et al. | 2010/0081584 A1 | 4/2010 | Perez |
| 7,867,954 B2 | 1/2011 | Warrender et al. | 2010/0196104 A1 | 8/2010 | Constantz et al. |
| 7,922,809 B1 | 4/2011 | Constantz et al. | 2010/0258035 A1 | 10/2010 | Constantz et al. |
| 7,927,419 B2 | 4/2011 | Roddy | 2010/0258312 A1 | 10/2010 | Brenneis et al. |
| 8,006,446 B2 | 8/2011 | Constantz et al. | 2010/0273912 A1 | 10/2010 | Roddy et al. |
| 8,039,253 B2 | 10/2011 | Asou | 2010/0282466 A1 | 11/2010 | Brenneis et al. |
| 8,261,827 B2 | 9/2012 | Roddy | 2010/0292365 A1 | 11/2010 | Roddy et al. |
| 8,281,859 B2 | 10/2012 | Roddy | 2010/0294496 A1 | 11/2010 | Woytowich et al. |
| 8,297,357 B2 | 10/2012 | Brenneis | 2010/0313793 A1 | 12/2010 | Constantz et al. |
| 8,307,899 B2 | 11/2012 | Brenneis | 2011/0000400 A1 | 1/2011 | Roddy |
| 8,318,642 B2 | 11/2012 | Roddy | 2011/0017452 A1 | 1/2011 | Benkley |
| 8,327,939 B2 | 12/2012 | Roddy | 2011/0100626 A1 | 5/2011 | Brenneis |
| 8,333,240 B2 | 12/2012 | Roddy | 2011/0297378 A1 | 12/2011 | Reddy et al. |
| 8,399,387 B2 | 3/2013 | Roddy | 2012/0145393 A1 | 6/2012 | Roddy |
| 8,434,553 B2 | 5/2013 | Brenneis et al. | 2012/0152539 A1 | 6/2012 | Karcher |
| 8,440,596 B2 | 5/2013 | Brenneis et al. | 2012/0193097 A1 | 8/2012 | Roddy |
| 2002/0033121 A1 | 3/2002 | Marko | 2012/0227631 A1 | 9/2012 | Roddy |
| 2002/0073897 A1 | 6/2002 | Trato | 2012/0234541 A1 | 9/2012 | Roddy |
| 2002/0117090 A1 | 8/2002 | Ku | 2012/0267107 A1 | 10/2012 | Benkley et al. |
| 2003/0116065 A1 | 6/2003 | Griffith et al. | 2012/0285682 A1 | 11/2012 | Santra et al. |
| 2003/0116887 A1 | 6/2003 | Scott | 2012/0291674 A1 | 11/2012 | Brenneis et al. |
| 2003/0167970 A1 | 9/2003 | Polston | 2012/0318506 A1 | 12/2012 | Benkley et al. |
| 2004/0007162 A1 | 1/2004 | Morioka et al. | 2012/0325119 A1 | 12/2012 | Brenneis et al. |
| 2004/0040475 A1 | 3/2004 | De La Roij et al. | 2012/0325476 A1 | 12/2012 | Brenneis et al. |

| | | | |
|---|---|---|---|
| 2012/0325477 | A1 | 12/2012 | Brenneis et al. |
| 2012/0328377 | A1 | 12/2012 | Brenneis et al. |
| 2013/0008352 | A1 | 1/2013 | Roddy et al. |
| 2013/0048286 | A1 | 2/2013 | Morgan et al. |
| 2013/0061779 | A1 | 3/2013 | Brenneis et al. |
| 2013/0112405 | A1 | 5/2013 | Chatterji et al. |

FOREIGN PATENT DOCUMENTS

| | | |
|---|---|---|
| CA | 2153372 | 1/2006 |
| CN | 1054620 C | 11/1997 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 1900703 | 3/2008 |
| EP | 2075303 | 7/2009 |
| GB | 1469954 | 4/1997 |
| GB | 2455446 | 6/2009 |
| JP | 52117316 | 10/1977 |
| JP | 10110487 | 4/1998 |
| RU | 2026959 | 1/1995 |
| RU | 2003136028 | 5/2005 |
| SU | 1373781 | 2/1988 |
| WO | WO 83/01443 | 4/1983 |
| WO | 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | 2007/041841 | 4/2007 |
| WO | WO 2007/048999 | 5/2007 |
| WO | WO 2007/128945 | 11/2007 |
| WO | WO 2009/138747 | 11/2009 |

OTHER PUBLICATIONS

Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix a Cement Additive", 1999.
HES Brochure "Pozmix Cement and Pozmix 140" (undated but admitted as prior art).
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
LAFARGE MSDS "Cement Kiln Dust", Mar. 3, 2005.
LAFARGE MSDS "LaFarge Blended Cement (cement)", Mar. 3, 2005.
TXI Material Safety Data Sheet for PRESSUR-SEAL Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-973, 2005.
Answer 13 of 24 Chemical Abstracts on STN "Manufacture of ceramic particles from floatstone and fly ash", CN 1182062 (abstract only) (undated but admitted as prior art).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Office Action from U.S. Appl. No. 12/263,800, May 1, 2009.
Nelson, "Well Cementing", 1990.

"Fly Ash Resource Center-Pozzolan," available at http://www.rmajko.com/pozzolan.htm, Apr. 20, 2009.
Foreign Search Report from PCT/GB2009/000295, Feb. 3, 2009.
EPO Application No. 06794648.3 Examination Report, Apr. 17, 2009.
EPO Application No. 06779194.7 Examination Report, May 29, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
English language translation of Foreign Office Action for Application No. RU2008113765, Jul. 6, 2009.
Foreign Office Action for Canadian Patent Application No. 2621835, Oct. 2, 2009.
Foreign Office Action for Canadian Patent Application No. 2621832, Oct. 5, 2009.
PCT International Search Report and Written Opinion for International Application No. PCT/GB2009/002598, Feb. 11, 2010.
PCT International Search Report and Written Opinion for International Application No. PCT/GB2009/002597, Feb. 1, 2010.
English language translation of USSR Patent No. RU 2026959, Jan. 20, 1995.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from USPTO U.S. Appl. No. 12/609,993, Jul. 26, 2010.
Foreign Office Action for EP Application No. 06 779 194.7, Jul. 2, 2010.
HES Brochure "Enhancer 923™ Cement Agent", 2010.
HES Brochure "Enhancer 923™ Agent—Successes from the Field", 2010.
Office Action from U.S. Appl. No. 12/558,097, Sep. 3, 2010.
Foreign Office Action for EP Application No. 06 779 199.6, Mar. 1, 2010.
Office Action from U.S. Appl. No. 12/844,612, Oct. 1, 2010.
Foreign Office Action for EP Application No. 06 779 191.3, Mar. 31, 2010.
Foreign Office Action for CN Application No. 200680042004.X, May 12, 2010.
Foreign Office Action for RU Application No. 2008113766, Jul. 14, 2009.
Foreign Office Action for RU Application No. 2008113766, Apr. 8, 2010.
Foreign Office Action for EP Application No. 06 794 646.7, Sep. 24, 2010.
Foreign Office Action for Canadian Application No. 2650630, Oct. 14, 2010.
Foreign Office Action for EP Application No. 09 713 469.6, Sep. 28, 2010.
PCT International Search Report and Written Opinion for International Application No. PCT/GB2009/000295, Jul. 30, 2009.
PCT International Preliminary Report on Patentability for International Application No. PCT/GB2009/000295, Aug. 24, 2010.
Foreign Office Action for Canadian Application No. 2658155, Nov. 16, 2010.
English language translation of Foreign Office Action for Chinese Application No. 200680042014.3, Dec. 1, 2010.
Office Action from U.S. Appl. No. 12/844,612, Jan. 28, 2011.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Preliminary Report on Patentability for International Application No. PCT/GB2009/002018, Mar. 24, 2011.
Notice of Allowance for U.S. Appl. No. 12/544,915, Aug. 1, 2011.
Office Action from U.S. Appl. No. 12/844,612, Sep. 6, 2011.
PCT International Search Report and Written Opinion for International Application No. PCT/GB2011/000933, Sep. 22, 2011.
Office Action from U.S. Appl. No. 12/264,010, Oct. 31, 2011.
Office Action from U.S. Appl. No. 12/844,612, Dec. 23, 2011.
PCT International Search Report and Written Opinion for International Application No. PCT/GB2011/001411, Jan. 27, 2012.
Office Action from U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action from U.S. Appl. No. 13/447,560, May 31, 2012.
Office Action from U.S. Appl. No. 12/821,412, Jun. 5, 2012.
Adaska and Taubert, "Beneficial Uses of Cement Kiln Dust", 2008 IEEE/PCA 50th Cement Industry Technical Conference, Miami, FL, pp. 1-19, May 19, 2008.
Office Action from U.S. Appl. No. 12/825,004, Jun. 14, 2012.
Notice of Allowance from U.S. Appl. No. 13/447,560, Jun. 21, 2012.
Office Action from U.S. Appl. No. 13/479,476, Jul. 2, 2012.
Office Action from U.S. Appl. No. 12/975,196, Jul. 3, 2012.
Final Office Action from U.S. Appl. No. 12/844,612, Jul. 30, 2012.
U.S. Appl. No. 13/595,493, filed Aug. 27, 2012, James Robert Benkley.
U.S. Appl. No. 13/598,052, filed Aug. 29, 2012, D. Chad Brenneis.
U.S. Appl. No. 13/605,875, filed Sep. 6, 2012, D. Chad Brenneis.
U.S. Appl. No. 13/606,098, filed Sep. 7, 2012, Chad Brenneis.
U.S. Appl. No. 13/606,120, filed Sep. 7, 2012, Chad Brenneis.
U.S. Appl. No. 13/447,560, filed Apr. 16, 2012, Craig W. Roddy.
U.S. Appl. No. 13/180,238, filed Jul. 11, 2011, Jeffrey Karcher.
U.S. Appl. No. 13/399,913, filed Feb. 17, 2012, Craig W. Roddy.
Foreign Office Action for Canadian Application No. 2736148 dated May 29, 2012.
Office Action from USPTO for U.S. Appl. No. 13/431,701 dated Nov. 9, 2012.
Office Action from USPTO for U.S. Appl. No. 13/620,163 dated Nov. 9, 2012.
International Search Report and Written Opinion for PCT/US2012/046117 dated Oct. 26, 2012.
Office Action from USPTO for U.S. Appl. No. 13/669,149 dated Dec. 19, 2012.
Office Action from USPTO for U.S. Appl. No. 13/606,098 dated Dec. 13, 2012.
HES Brochure "VersaCem™ Cement" dated Jan. 2007.
Office Action for U.S. Appl. No. 13/620,013 dated Feb. 26, 2013.
International Search Report for PCT/GB2011/001749 dated Apr. 5, 2012.
International Search Report and Written Opinion for PCT/GB2010/000712 dated Jul. 26, 2010.
Notice of Allowance from U.S. Appl. No. 13/399,913 dated Aug. 23, 2012.
Notice of Allowance from U.S. Appl. No. 13/535,258 dated Sep. 7, 2012.
Notice of Allowance from U.S. Appl. No. 12/825,004 dated Sep. 20, 2012.
Office Action from U.S. Appl. No. 13/477,777 dated Oct. 15, 2012.
Notice of Allowance from U.S. Appl. No. 12/844,612 dated Oct. 18, 2012.
Final Office Action from U.S. Appl. No. 12/975,196 dated Oct. 23, 2012.
Office Action from U.S. Appl. No. 13/555,624 dated Oct. 19, 2012.
U.S. Appl. No. 13/622,821, filed Sep. 19, 2012.
U.S. Appl. No. 13/620,163, filed Sep. 14, 2012.
U.S. Appl. No. 13/620,013, filed Sep. 14, 2012.
U.S. Appl. No. 13/662,111, filed Oct. 26, 2012.
U.S. Appl. No. 13/669,149, filed Nov. 5, 2012.
U.S. Appl. No. 13/872,063 (Chatterji et al.) filed Apr. 23, 2013.
U.S. Appl. No. 13/889,398 (Benkley et al.) filed May 8, 2013.
U.S. Appl. No. 13/872,063 (Chatterji et al.) filed Apr. 26, 2013.
Notice of Allowance, U.S. Appl. No. 13/669,149 (Brenneis et al.) mailed May 13, 2013.
U.S. Appl. No. 13/767,710 (Benkley et al.) filed Feb. 14, 2013.
U.S. Appl. No. 13/851,391 (Chatterji et al.) filed Mar. 27, 2013.
U.S. Appl. No. 13/851,475 (Chatterji et al.) filed Mar. 27, 2013.
U.S. Appl. No. 13/851,925 (Chatterji et al.) filed Mar. 27, 2013.
U.S. Appl. No. 13/725,833 (Chatterji et al.) filed Dec. 21, 2012.
Office Action for U.S. Appl. No. 13/725,833 (Chatterji et al.) dated Apr. 10, 2013.

* cited by examiner

METHODS OF PLUGGING AND ABANDONING A WELL USING COMPOSITIONS COMPRISING CEMENT KILN DUST AND PUMICITE

CROSS-REFERENCE TO RELATED APPLICATIONS

This application is a divisional of U.S. patent application Ser. No. 12/821,412, "Methods of Plugging and Abandoning a Well Using Compositions Comprising Cement Kiln Dust and Pumicite," filed on Jun. 23, 2010, which is a continuation-in-part of co-pending U.S. patent application Ser. No. 12/606,381, entitled "Methods of Cementing Subterranean Formation Formations Using Cement Kiln Dust in Compositions Having Reduced Portland Cement Content," filed on Oct. 27, 2009, which is a continuation-in-part of U.S. application Ser. No. 12/420,630, issued as U.S. Pat. No. 7,631,692, entitled "Settable Compositions Comprising a Natural Pozzolan and Associated Methods," filed on Apr. 8, 2009, which is a continuation-in-part of U.S. patent application Ser. No. 12/349,676, issued as U.S. Pat. No. 7,674,332, entitled "Extended Settable Compositions Comprising Cement Kiln Dust and Associated Methods," filed on Jan. 7, 2009, which is a divisional of U.S. patent application Ser. No. 12/034,886, issued as U.S. Pat. No. 7,478,675, entitled "Extended Settable Compositions Comprising Cement Kiln Dust and Associated Methods, filed on Feb. 21, 2008, which is a continuation-in-part of U.S. patent application Ser. No. 11/223,669, issued as U.S. Pat. No. 7,445,669, entitled "Settable Compositions Comprising Cement Kiln Dust and Additive(s)," filed Sep. 9, 2005, the entire disclosures of which are incorporated herein by reference.

BACKGROUND

The present invention relates to cementing operations and, more particularly, in certain embodiments, to plug-and-abandon operations using plugging compositions comprising cement kiln dust ("CKD"), pumicite, and/or lime.

In cementing methods, such as well construction and remedial cementing, sealant compositions are commonly utilized. As used herein, the term "sealant composition" refers to a composition(s) that hydraulically sets or otherwise develops compressive strength suitable for use in subterranean applications. One type of a sealant composition is a plugging composition that can be used in plug-and-abandon operations whereby a plug is formed in a well bore to seal off the well bore for abandonment. In performing plug-and-abandon operations, a plugging composition may be placed in the well bore at a desired depth. The plugging composition should set in the wellbore, forming a hardened mass (e.g., a plug) that seals of selected intervals of the well bore. The plug should prevent and/or reduce zonal communication and migration of fluids that may contaminate water-containing formations. It may desirable in certain instances to form one or more plugs in the well bore adjacent to hydrocarbon-producing formations and water-containing formations.

Sealant compositions used heretofore may comprise Portland cement. Portland cement generally is a major component of the cost for the sealant compositions. To reduce the cost of such sealant compositions, other components may be included in the sealant composition to replace some of the Portland cement. Such components may include cement kiln dust ("CKD"), fly ash, slag cement, shale, metakaolin, zeolite, and the like. CKD is a partially calcined kiln feed which is removed from the gas stream and collected, for example, in a dust collector during the manufacture of cement. The term "CKD" is used herein to mean cement kiln dust made as described above and equivalent forms of cement kiln dust made in other ways.

SUMMARY

The present invention relates to cementing operations and, more particularly, in certain embodiments, to plug-and-abandon operations using plugging compositions comprising CKD, pumicite, and/or lime.

An embodiment of the present invention provides a method of plugging a well bore for abandonment comprising: placing a plugging composition in the well bore, the plugging composition comprising cement kiln dust in an amount of about 5% to about 100% by weight of cementitious components, pumicite in an amount of about 5% to about 100% by weight of cementitious components, 0% to about 24% of Portland cement by weight of cementitious components, and water; and allowing the plugging composition to set and form a plug.

Another embodiment of the present invention provides a method of plugging a well bore for abandonment comprising: placing a plugging composition in the well bore, the plugging composition comprising: a cementitious component consisting essentially of cement kiln dust, pumicite, and lime, and water; and allowing the plugging composition to set and form a plug.

Yet another embodiment of the present invention provides a plugging composition comprising: cement kiln dust in an amount of about 5% to about 100% by weight of cementitious components; pumicite in an amount of about 5% to about 100% by weight of cementitious components; 0% to about 24% of Portland cement by weight of cementitious components; and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, in certain embodiments, to plug-and-abandon operations using plugging compositions comprising CKD, pumicite, and/or lime. There may be several potential advantages to the methods and compositions of the present invention, only some of which may be alluded to herein. One of the many potential advantages of embodiments of the present invention is that the inclusion of the CKD and/or pumicite in the plugging composition may reduce the amount of, or potentially eliminate, a higher cost additive, such as Portland cement, resulting in a more economical plugging composition. Another potential advantage of embodiments of the present invention is that reduction of the amount of Portland cement should reduce the carbon footprint of the plug-and-abandon operation.

Embodiments of the plugging compositions of the present invention may comprise CKD, pumicite, and water. In an embodiment, the plugging compositions may further comprise lime. In one particular embodiment, the plugging composition comprises a cementitious component that consists essentially of CKD, pumicite, and lime. Other optional additives may also be included in embodiments of the plugging compositions of the present invention as desired, including, but not limited to, fly ash, slag cement, metakaolin, shale, zeolite, combinations thereof, and the like. As described in more detail herein, embodiments of the plugging compositions of the present invention may be foamed and/or extended as desired by those of ordinary skill in the art.

The plugging compositions of the present invention should have a density suitable for a particular application as desired by those of ordinary skill in the art, with the benefit of this disclosure. In some embodiments, the plugging compositions of the present invention may have a density in the range of from about 8 pounds per gallon ("ppg") to about 16 ppg. In other embodiments, the plugging compositions may be foamed to a density in the range of from about 8 ppg to about 13 ppg.

Embodiments of the plugging compositions generally may comprise CKD. During the manufacture of cement, a waste material commonly referred to as cement kiln dust ("CKD") is generated. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

The CKD generally may exhibit cementitious properties, in that it may set and harden in the presence of water. In accordance with embodiments of the present invention, the CKD may be used, among other things, to replace higher cost cementitious components, such as Portland cement, resulting in more economical plugging compositions. In addition, substitution of the CKD for the Portland cement should result in a plugging composition with a reduced carbon footprint.

The CKD may be included in the plugging compositions in an amount sufficient to provide the desired compressive strength, density, cost reduction, and/or reduced carbon footprint. In some embodiments, the CKD may be present in the plugging compositions of the present invention in an amount in the range of from about 1% to about 100% by weight of cementitious components. Cementitious components include those components or combinations of components of the plugging compositions that hydraulically set, or otherwise harden, to develop compressive strength, including, for example, CKD, fly ash, pumicite, slag, lime, shale, and the like. The CKD may be present, in certain embodiments, in an amount of about 5%, about 10%, about 15%, about 20%, about 25%, about 30%, about 35%, about 40%, about 45%, about 50%, about 55%, about 60%, about 65%, about 70%, about 75%, about 80%, about 90%, or about 95%. In one embodiment, the CKD may be present in the plugging compositions of the present invention in an amount in the range of from about 5% to about 99% by weight of cementitious components. In another embodiment, the CKD may be present in an amount in the range of from about 5% to about 80% by weight of cementitious components. In yet another embodiment, the CKD may be present in an amount in the range of from about 50% to about 80% by weight of cementitious components. One of ordinary skill in the art, with the benefit of this disclosure, will recognize the appropriate amount of CKD to include for a chosen application.

Embodiments of the plugging compositions further may comprise pumicite. Generally, pumicite is a volcanic rock that exhibits cementitious properties, in that it may set and harden in the presence of hydrated lime and water. Hydrated lime may be used in combination with the pumicite, for example, to provide sufficient calcium ions for pumicite to set. In accordance with embodiments of the present invention, the pumicite may be used, among other things, to replace higher cost cementitious components, such as Portland cement, resulting in more economical plugging compositions. As previously mentioned, replacement of the Portland cement should also result in a plugging composition with a reduced carbon footprint.

Where present, the pumicite may be included in an amount sufficient to provide the desired compressive strength, density, cost reduction and/or reduced carbon footprint for a particular application. In some embodiments, the pumicite may be present in the plugging compositions of the present invention in an amount in the range of from about 1% to about 100% by weight of cementitious components. For example, the pumicite may be present in an amount of about 5%, about 10%, about 15%, about 20%, about 25%, about 30%, about 35%, about 40%, about 45%, about 50%, about 55%, about 60%, about 65%, about 70%, about 75%, about 80%, about 90%, or about 95%. In one embodiment, the pumicite may be present in the plugging compositions of the present invention in an amount in the range of from about 5% to about 99% by weight of cementitious components. In another embodiment, the pumicite may be present in an amount in the range of from about 5% to about 80% by weight of cementitious components. In yet another embodiment, the pumicite may be present in an amount in the range of from about 10% to about 50% by weight of cementitious components. In yet another embodiment, the pumicite may be present in an amount in the range of from about 25% to about 50% by weight of cementitious components. One of ordinary skill in the art, with the benefit of this disclosure, will recognize the appropriate amount of the natural pozzolan to include for a chosen application.

The water that may be used in embodiments of the plugging compositions include, for example, freshwater, saltwater (e.g., water containing one or more salts dissolved therein), brine (e.g., saturated saltwater produced from subterranean formations), seawater, or combinations thereof. Generally, the water may be from any source, provided that the water does not contain an excess of compounds that may undesirably affect other components in the plugging composition. In some embodiments, the water may be included in an amount sufficient to form a pumpable slurry. In some embodiments, the water may be included in the plugging compositions of the present invention in an amount in the range of about 40% to about 200% by weight of cementitious components. In some embodiments, the water may be included in an amount in the range of about 40% to about 150% by weight of cementitious components. One of ordinary skill in the art, with the benefit of this disclosure, will recognize the appropriate amount of water to include for a chosen application.

Embodiments of the plugging compositions further may comprise lime. In certain embodiments, the lime may be hydrated lime. The lime may be included in embodiments of the plugging compositions, for example to, form a hydraulic composition with other components of the plugging compositions, such as the pumicite, fly ash, slag, and/or shale. Where present, the lime may be included in the plugging compositions in an amount sufficient for a particular application. In some embodiments, the lime may be present in an amount in the range of from about 1% to about 40% by weight of cementitious components. For example, the lime may be present in an amount of about 5%, about 10%, about 15%, about 20%, about 25%, about 30%, or about 35%. In one embodiment, the lime may be present in an amount in the range of from about 5% to about 20% by weight of cementitious components. One of ordinary skill in the art, with the benefit of this disclosure, will recognize the appropriate amount of the lime to include for a chosen application.

In an embodiment, plugging compositions of the present invention may comprise pumicite and CKD in a weight ratio of from about 1/99 to about 99/1 with lime present in an amount of from about 5% to about 15% by the combined weight of the pumicite and the CKD. In another embodiment, plugging compositions of the present invention may comprise pumicite and CKD in a weight ratio of from about 65/35 to about 80/20 with lime present in an amount of from about 5% to about 15% by the combined weight of the pumicite and the CKD. In general, it should be understood that as the amount of the CKD is decreased the amount of the pumicite may be increased, in accordance with embodiments of the present invention.

It should be understood that use of Portland cement in embodiments of the plugging compositions should be reduced or even eliminated to provide, for example, the desired cost savings and/or reduced carbon footprint. Accordingly, embodiments of the plugging compositions of the present invention may comprise Portland cement in an amount of 0% to about 24%. For example, the Portland cement may be present in an amount of about 1%, 5%, about 10%, about 15%, or about 20%. In an embodiment, the Portland cement may be present in an amount in the range of from about 0% to about 20%. In another embodiment, the Portland cement may be present in an amount in the range of from about 0% to about 10%. In yet another embodiment, the plugging compositions may be essentially free of Portland cement. As used herein, the term "essentially free" means less than about 1% by weight of cementitious components. In certain embodiments, the plugging composition may contain Portland cement in an amount less than about 0.1% by weight of cementitious components and, alternatively, less than about 0.01% by weight of cementitious components. By way of example, the plugging composition, in certain embodiments, may be free of Portland cement, in that the plugging composition contains no Portland cement.

The Portland cements include those classified as Classes A, C, G, and H cements according to American Petroleum Institute, API Specification for Materials and Testing for Well Cements, API Specification 10, Fifth Ed., Jul. 1, 1990. In addition, the Portland cements include those classified as ASTM Type I, II, or III.

Embodiments of the plugging compositions further may comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime so that, when mixed with water, it should set to form a hardened mass. Class F fly ash generally does not contain sufficient lime, so an additional source of calcium ions is required for the Class F fly ash to form a hydraulic composition. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZMIX® A cement additive, commercially available from Halliburton Energy Services, Inc., Duncan, Okla.

Where present, the fly ash generally may be included in the plugging compositions in an amount sufficient to provide the desired compressive strength, density, and/or cost. In some embodiments, the fly ash may be present in the plugging compositions of the present invention in an amount in the range of about 5% to about 75% by weight of cementitious components. In some embodiments, the fly ash may be present in an amount in the range of about 10% to about 60% by weight of cementitious components. One of ordinary skill in the art, with the benefit of this disclosure, will recognize the appropriate amount of the fly ash to include for a chosen application.

Embodiments of the plugging compositions further may comprise a slag cement. In some embodiments, a slag cement that may be suitable for use may comprise slag. Slag generally does not contain sufficient basic material, so slag cement further may comprise a base to produce a hydraulic composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the plugging compositions in an amount sufficient to provide the desired compressive strength, density, and/or cost. In some embodiments, the slag cement may be present in the plugging compositions of the present invention in an amount in the range of about 0.1% to about 99% by weight of cementitious components. In some embodiments, the slag cement may be present in an amount in the range of about 5% to about 75% by weight of cementitious components. One of ordinary skill in the art, with the benefit of this disclosure, will recognize the appropriate amount of the slag cement to include for a chosen application.

Embodiments of the plugging compositions further may comprise metakaolin. Generally, metakaolin is a white pozzolan that may be prepared by heating kaolin clay, for example, to temperatures in the range of about 600° C. to about 800° C. In some embodiments, the metakaolin may be present in the plugging compositions of the present invention in an amount in the range of about 5% to about 95% by weight of cementitious components. In some embodiments, the metakaolin may be present in an amount in the range of about 10% to about 50% by weight of cementitious components. One of ordinary skill in the art, with the benefit of this disclosure, will recognize the appropriate amount of the metakaolin to include for a chosen application.

Embodiments of the plugging compositions further may comprise shale. Among other things, shale included in the plugging compositions may react with excess lime to form a suitable cementing material, for example, calcium silicate hydrate. A variety of shales may be suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are commercially available from TXI Energy Services, Inc., Houston, Tex. Generally, the shale may have any particle size distribution as desired for a particular application. In certain embodiments, the shale may have a particle size distribution in the range of about 37 micrometers to about 4,750 micrometers.

Where present, the shale may be included in the plugging compositions of the present invention in an amount sufficient to provide the desired compressive strength, density, and/or cost. In some embodiments, the shale may be present in the plugging compositions of the present invention in an amount in the range of about 5% to about 75% by weight of cementitious components. In some embodiments, the shale may be present in an amount in the range of about 10% to about 35% by weight of cementitious components. One of ordinary skill in the art, with the benefit of this disclosure, will recognize the appropriate amount of the shale to include for a chosen application.

Embodiments of the plugging compositions further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Pat. No. 7,445,669. An example of a suitable source of zeolite is available from the C2C Zeolite Corporation of Calgary, Canada. In some embodiments, the zeolite may be present in the plugging compositions of the present invention in an amount in the range of about 5% to about 65% by weight of cementitious components. In certain embodiments, the zeolite may be present in an amount in the range of about 10% to about 40% by weight of cementitious components. One of ordinary skill in the art, with the benefit of this disclosure, will recognize the appropriate amount of the zeolite to include for a chosen application.

Embodiments of the plugging compositions further may comprise a set retarding additive. As used herein, the term "set retarding additive" refers to an additive that retards the setting of the plugging compositions of the present invention. Examples of suitable set retarding additives include, but are not limited to, ammonium, alkali metals, alkaline earth metals, metal salts of sulfoalkylated lignins, organic acids (e.g., hydroxycarboxy acids), copolymers that comprise acrylic acid or maleic acid, and combinations thereof. One example of a suitable sulfoalkylated lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the trademarks HR® 4, HR® 5, HR® 7, HR® 12, HR®15, HR®25, HR® 601, SCR™ 100, and SCR™ 500 retarders. Generally, where used, the set retarding additive may be included in the plugging compositions of the present invention in an amount sufficient to provide the desired set retardation. In some embodiments, the set retarding additive may be present in the plugging compositions of the present invention an amount in the range of about 0.1% to about 5% by weight of cementitious components. One of ordinary skill in the art, with the benefit of this disclosure, will recognize the appropriate amount of the set retarding additive to include for a chosen application.

Optionally, other additional additives may be added to the plugging compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical property enhancing additives, lost-circulation materials, filtration-control additives, dispersants, fluid loss control additives, defoaming agents, foaming agents, oil-swellable particles, water-swellable particles, thixotropic additives, and combinations thereof. Specific examples of these, and other, additives include crystalline silica, amorphous silica, fumed silica, salts, fibers, hydratable clays, microspheres, rice husk ash, elastomers, elastomeric particles, resins, latex, combinations thereof, and the like. A person having ordinary skill in the art, with the benefit of this disclosure, will readily be able to determine the type and amount of additive useful for a particular application and desired result.

As will be appreciated by those of ordinary skill in the art, embodiments of the plugging compositions of the present invention may be used for forming a seal in a plug-and-abandon operation. An example of a method for plugging and abandoning a well comprises placing a plugging composition in a selected plug location in a well bore and allowing the plugging composition to set to form a plug. The plug location may be selected so that the well bore can be sealed off for abandonment. For example, the plug location may be selected so that selected interval of the well bore may be sealed. In an embodiment, the selected location may be adjacent to a hydrocarbon-containing formation or a water-containing formation. In an embodiment, the plugging and abandoning operation may include the formation of two or more plugs in the well bore. For example, the method may further include placement of a second plugging composition in another selected plug location in the well bore.

To facilitate a better understanding of the present invention, the following examples of certain aspects of some embodiments are given. In no way should the following examples be read to limit, or define, the scope of the invention.

Example 1

A series of sample plugging compositions were prepared at room temperature and subjected to 24-hour crush strength tests at 185° F. in accordance with API Specification 10 to determine force resistance properties of plugging compositions that comprise CKD, pumicite, and lime. The sample compositions were allowed to cure in a water bath at 185° F. for twenty-four hours. Immediately after removal from the water bath, crush strengths were determined using a Tinius Olsen tester. The results of the crush strength tests are set forth in the table below.

Each of the samples had a density of 12.5 ppg and contained 200-mesh pumicite, Joppa CKD, lime, and water and were free of Portland cement. In the following table, percent by weight is based on the weight of the pumicite and the CKD in the samples.

TABLE 1

Crush Strength Tests: Pumicite, CKD, and Lime

| Sample | Water (gal/sk) | Pumicite (% by wt) | CKD (% by wt) | Lime (% by wt) | 24-Hr Crush Strength (psi) |
|---|---|---|---|---|---|
| 1 | 9.42 | 65 | 35 | 5 | 83.8 |
| 2 | 9.82 | 65 | 35 | 10 | 126.3 |
| 3 | 10.15 | 65 | 35 | 14 | 229 |
| 4 | 9.33 | 70 | 30 | 5 | 75.6 |
| 5 | 9.74 | 70 | 30 | 10 | 358 |
| 6 | 10.06 | 70 | 30 | 14 | 182.6 |
| 7 | 9.25 | 75 | 25 | 5 | 52.8 |
| 8 | 9.65 | 75 | 25 | 10 | 314 |
| 9 | 9.98 | 75 | 25 | 14 | 147 |
| 10 | 9.16 | 80 | 20 | 5 | 32.1 |
| 11 | 9.57 | 80 | 20 | 10 | 305 |
| 12 | 9.89 | 80 | 20 | 14 | 144.8 |

Example 1 thus indicates that plugging compositions containing pumicite, CKD, and lime and essentially free of Portland cement may have properties suitable for use in plug-and-abandon operations.

Example 2

An additional series of sample plugging compositions were prepared and tested to determine to further analyze the force resistance properties of plugging compositions that comprise CKD, pumicite, and lime. The samples were prepared and allowed to cure in a water bath at 140° F. The twenty-four hour and seventh-two hour crush strengths were determined at 140° F. using a Tinius Olson tester in accordance with API Specification 10. The results of the crush strength tests are set forth in the table below.

Each of the samples had a density of 15 ppg and comprised Portland Class H cement, Joppa CKD, 200-mesh pumicite, hydrated lime, a dispersant (CFR™-3 cement friction reducer), and/or water, as indicated in the table below. In the following table, percent by weight is based on the weight of the pumicite and the CKD for Samples 13-21 and on the Portland cement for Sample 22.

TABLE 2

Crush Strength Tests: Pumicite, CKD, and Lime

| Sample | Portland Cement (% by wt) | CKD (% by wt) | Pumicite (% by wt) | Hydrated Lime (% by wt) | Dispersant (% by wt) | 24-Hr Crush Strength (psi) | 72-Hr Crush Strength (psi) |
|---|---|---|---|---|---|---|---|
| 13 | — | 90 | 10 | 5 | 0.75 | 306 | 1209 |
| 14 | — | 75 | 25 | 5 | 1 | 514 | 1988 |
| 15 | — | 75 | 25 | 10 | 1 | 520 | 1673 |
| 16 | — | 50 | 50 | 5 | 1.25 | 876 | 2180 |
| 17 | — | 50 | 50 | 10 | 1.25 | 1352 | 2280 |
| 18 | — | 25 | 75 | 5 | 1.5 | 896 | 1402 |
| 19 | — | 25 | 75 | 10 | 1.5 | 1674 | 1850 |
| 20 | — | 100 | 0 | 0 | 1 | 200 | 520 |
| 21 | — | 0 | 100 | 10 | 2 | 812 | 1261 |
| 22 | 100 | — | — | — | — | 1202 | 2460 |

Example 2 thus indicates that plugging compositions containing pumicite, CKD, and lime and essentially free of Portland cement may have properties suitable for use in plug-and-abandon operations.

Example 3

An additional series of sample plugging compositions were prepared and tested to determine to further analyze plugging compositions that comprise CKD, pumicite, and lime. The samples were prepared and allowed to cure in a water bath at 140° F. The crush strengths were determined at forty-eight hours and 160° F. using a Tinius Olson tester in accordance with API Specification 10. The thickening time for each sample was also determined at 140° F. in accordance with API Specification 10.

Each of the samples had a density of 14 ppg and comprised Portland Class H cement, silica (Silicalite™ cement additive), Joppa CKD, 200-mesh pumicite, hydrated lime, a dispersant (CRF™-3 cement friction reducer), a cement set retarder (NR®-5 cement retarder), and/or water, as indicated in the table below. In the following table, percent by weight is based on the weight of the pumicite and the CKD for Samples 23-26 and on the Portland cement for Sample 27.

Example 3 thus indicates that plugging compositions containing pumicite, CKD, and lime and essentially free of Portland cement may have properties suitable for use in plug-and-abandon operations.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

TABLE 3

Crush Strength Tests: Pumicite, CKD, and Lime

| Sample | Portland Cement (% by wt) | Silica (% by wt) | CKD (% by wt) | Pumicite (% by wt) | Hydrated Lime (% by wt) | Dispersant (% by wt) | Set Retarder (% by wt) | Thickening Time to 70 bc (psi) | 48-Hr Crush Strength (psi) |
|---|---|---|---|---|---|---|---|---|---|
| 23 | — | — | 75 | 25 | 5 | 1 | 1 | 6:02 | 1013 |
| 24 | — | — | 50 | 50 | 5 | 1 | 0.7 | 5:36 | 1701 |
| 25 | — | — | 50 | 50 | 10 | 1.25 | 0.75 | 5:23 | 1717 |
| 26 | — | — | 25 | 75 | 10 | 1.75 | 0.4 | 4:41 | 1523 |
| 27 | 100 | 8 | — | — | — | — | 0.4 | 5:47 | 2040 |

What is claimed is:

1. A plugging composition comprising:
   a cementitious component comprising:
      cement kiln dust in an amount in a range of from about 5% to about 100% by weight of the cementitious component;
      pumicite in an amount in a range of from about 5% to about 100% by weight of the cementitious component; and
      0% to about 24% of Portland cement by weight of the cementitious component; and
   water;
   wherein the plugging composition is essentially free of latex.

2. The plugging composition of claim 1 wherein the plugging composition has a density in a range of from about 8 pounds per gallon to about 16 pounds per gallon.

3. The plugging composition of claim 1 wherein the cement kiln dust is present in an amount in a range of from about 25% to about 75% by weight of the cementitious component, and wherein the pumicite is present in an amount in a range of from about 25% to about 75% by weight of the cementitious components.

4. The plugging composition of claim 1 wherein the water is selected from the group consisting of freshwater, saltwater, brine, seawater, and any combination thereof.

5. The plugging composition of claim 1 wherein the water is present in an amount in a range of from about 40% to about 200% by weight of the cementitious component.

6. The plugging composition of claim 1 wherein the cementitious component further comprises lime.

7. The plugging composition of claim 1 wherein the cementitious component further comprises hydrated lime in an amount in a range of from about 1% to about 40% by weight of the cementitious component.

8. The plugging composition of claim 1 wherein the plugging composition comprises 0% to about 1% of the Portland cement by weight of the cementitious component.

9. The plugging composition of claim 1 wherein the plugging composition further comprises at least one additive selected from the group consisting of fly ash, slag cement, metakaolin, shale, zeolite, crystalline silica, amorphous silica, fumed silica, salt, fiber, hydratable clay, microsphere, rice husk ash, elastomer, elastomeric particle, resin, and any combination thereof.

10. The plugging composition of claim 1 wherein the plugging composition further comprises at least one additive selected from the group consisting of a set retarding additive, a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

11. The plugging composition of claim 1 wherein the plugging composition has a 48-hour crush strength at 160° F. in a range of from about 1013 psi to about 2040 psi.

12. A plugging composition comprising:
   a cementitious component consisting essentially of cement kiln dust, pumicite, and lime; and
   water;
   wherein the plugging composition is essentially free of Portland cement; and
   wherein the plugging composition is essentially free of latex.

13. The plugging composition of claim 12 wherein the plugging composition has a density in a range of from about 8 pounds per gallon to about 16 pounds per gallon.

14. The plugging composition of claim 12 wherein the cement kiln dust is present in an amount in a range of from about 25% to about 75% by weight of the cementitious component, and wherein the pumicite is present in an amount in a range of from about 25% to about 75% by weight of the cementitious component.

15. The plugging composition of claim 12 wherein the water is selected from the group consisting of freshwater, saltwater, brine, seawater, and any combination thereof.

16. The plugging composition of claim 12 wherein the lime comprises hydrated lime, the hydrated lime being present in an amount in a range of from about 1% to about 40% by weight of the cementitious component.

17. The plugging composition of claim 12 wherein the plugging composition further comprises at least one additive selected from the group consisting of zeolite, crystalline silica, amorphous silica, fumed silica, salt, fiber, hydratable clay, microsphere, rice husk ash, elastomer, elastomeric particle, resin, and any combination thereof.

18. The plugging composition of claim 12 wherein the plugging composition further comprises at least one additive selected from the group consisting of a set retarding additive, a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

19. The plugging composition of claim 12 wherein the plugging composition has a 48-hour crush strength at 160° F. in a range of from about 1013 psi to about 2040 psi.

20. A plugging composition comprising:
   a cementitious component consisting essentially:
      cement kiln dust in an amount in a range of from about 25% to about 75% by weight of the cementitious component;
      pumicite in an amount in a range of from about 25% to about 75% by weight of the cementitious component; and
      hydrated lime in an amount in a range of from about 5% to about 20% by weight of the cementitious component;
   a dispersant; and
   water in an amount in a range of from about 40% to about 150% by weight of the cementitious component,
   wherein the plugging composition has a density in a range of from about 8 pounds per gallon to about 16 pounds per gallon,
   wherein the plugging composition is free of Portland cement,
   wherein the plugging composition has a 48-hour crush strength at 160° F. in a range of from about 1013 psi to about 2040 psi, and
   wherein the plugging composition is essentially free of latex.

* * * * *